US012046860B2

United States Patent
Nakamura et al.

(10) Patent No.: US 12,046,860 B2
(45) Date of Patent: Jul. 23, 2024

(54) CABLE CONNECTION STRUCTURE MANUFACTURING METHOD

(71) Applicant: OLYMPUS CORPORATION, Tokyo (JP)

(72) Inventors: Mikio Nakamura, Tokyo (JP); Hiroaki Shibuya, Sakado (JP); Takanori Sekido, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 557 days.

(21) Appl. No.: 17/308,151

(22) Filed: May 5, 2021

(65) Prior Publication Data

US 2021/0273394 A1   Sep. 2, 2021

Related U.S. Application Data

(63) Continuation of application No. PCT/JP2019/016979, filed on Apr. 22, 2019.

(30) Foreign Application Priority Data

Nov. 27, 2018   (WO) .................. PCT/JP2018/043577

(51) Int. Cl.
*H01R 43/02* (2006.01)
*B23K 20/10* (2006.01)
(Continued)

(52) U.S. Cl.
CPC ............. *H01R 4/021* (2013.01); *H01R 12/53* (2013.01); *H01R 12/57* (2013.01); *H01R 43/02* (2013.01);
(Continued)

(58) Field of Classification Search
CPC  H01R 43/0207; H01R 43/02; H01R 43/0256; H01R 12/53; H01R 12/57;
(Continued)

(56) References Cited

U.S. PATENT DOCUMENTS 2,603,735 A     7/1952 Butler
4,705,204 A *  11/1987 Hirota .................... H01R 43/02
                                              219/56.22

(Continued)

FOREIGN PATENT DOCUMENTS

JP   H07-169797 A    7/1995
JP   2003-258030 A   9/2003

(Continued)

OTHER PUBLICATIONS

Giagka et al, "Evaluation and optimization of the mechanical strength of bonds between metal foil and aluminium pads on thin ASICs using gold ball studs as micro-rivets," Proceedings of the 5th Electronics System-integration Technology Conference (ESTC), Helsinki, Finland, 2014, pp. 1-5. (Year: 2014).*

(Continued)

*Primary Examiner* — A. Dexter Tugbang
(74) *Attorney, Agent, or Firm* — Scully, Scott, Murphy & Presser, P.C.

(57) ABSTRACT

A cable connection structure manufacturing method includes: covering, by a first electrode, an end face of an electric cable, and covering, by a second electrode, a terminal of a substrate; plastically deforming the first electrode and the second electrode having substantially same hardness by first scrubbing in which the first electrode and the second electrode rub against each other at a first pressure and a first amplitude; polishing the first electrode and the second electrode by second scrubbing in which the first electrode and the second electrode rub against each other at a second pressure smaller than the first pressure and a second amplitude smaller than the first amplitude; and bonding the first electrode and the second electrode at a third pressure higher than the first pressure.

8 Claims, 9 Drawing Sheets

(51) Int. Cl.
 *H01R 4/02* (2006.01)
 *H01R 12/53* (2011.01)
 *H01R 12/57* (2011.01)

(52) U.S. Cl.
 CPC .......... *H01R 43/0207* (2013.01); *B23K 20/10* (2013.01); *H01R 43/0256* (2013.01); *Y10T 29/49174* (2015.01); *Y10T 29/49181* (2015.01); *Y10T 29/49183* (2015.01); *Y10T 29/49185* (2015.01)

(58) Field of Classification Search
 CPC .............. H01R 4/021; Y10T 29/49174; Y10T 29/49181; Y10T 29/49183; Y10T 29/49185; B23K 20/10
 See application file for complete search history.

(56) References Cited

U.S. PATENT DOCUMENTS

| | | | | |
|---|---|---|---|---|
| 5,024,367 | A | * | 6/1991 | Terakado ............... B23K 20/10 228/180.5 |
| 5,192,015 | A | * | 3/1993 | Ingle ................. H01R 43/0207 228/180.5 |
| 6,344,616 | B1 | | 2/2002 | Yokokawa |
| 7,484,998 | B2 | | 2/2009 | Benham |
| 8,298,008 | B2 | | 10/2012 | Negishi |
| 9,947,440 | B2 | | 4/2018 | Sekido |
| 2008/0257595 | A1 | * | 10/2008 | Hu ........................ H01R 12/57 29/846 |
| 2012/0097420 | A1 | | 4/2012 | Aoyama et al. |
| 2014/0042865 | A1 | | 2/2014 | Mourou et al. |
| 2014/0154928 | A1 | * | 6/2014 | Nonen ............... H01R 43/0207 29/857 |
| 2017/0000321 | A1 | | 1/2017 | Nakamura et al. |

FOREIGN PATENT DOCUMENTS

| | | | | |
|---|---|---|---|---|
| JP | 2011-023134 | A | | 2/2011 |
| JP | 2011-134613 | A | | 7/2011 |
| JP | 2012-089288 | A | | 5/2012 |
| JP | 2012-151183 | A | | 8/2012 |
| JP | 2013-018003 | A | | 1/2013 |
| JP | 2013-143464 | A | | 7/2013 |
| JP | 2014-022692 | A | | 2/2014 |
| JP | 2014-056917 | A | | 3/2014 |
| JP | 2014-107064 | A | | 6/2014 |
| JP | 2015-144168 | A | | 8/2015 |
| JP | 2015-144169 | A | | 8/2015 |
| JP | 2016-068148 | A | | 5/2016 |
| JP | 2016-149448 | A | | 8/2016 |
| JP | 2017216239 | A | * 12/2017 | .......... H01Q 1/3291 |
| JP | 6371414 | B2 | | 8/2018 |
| WO | 2013/005555 | A1 | | 1/2013 |
| WO | 2016/113848 | A1 | | 7/2016 |
| WO | 2020/110199 | A1 | | 6/2020 |

OTHER PUBLICATIONS

US Office Action dated Sep. 28, 2021 received in U.S. Appl. No. 17/308,265.
International Search Report dated Jul. 9, 2019 issued in PCT/JP2019/016979.
International Search Report dated Feb. 26, 2019 issued in PCT/JP2018/043577.

* cited by examiner

CABLE CONNECTION STRUCTURE MANUFACTURING METHOD

CROSS REFERENCE TO RELATED APPLICATION

This application is a continuation application of PCT/JP2019/016979 filed on Apr. 22, 2019 and claims benefit of International Application No. PCT/JP2018/043577 filed on Nov. 27, 2018, the entire contents of which are incorporated herein by this reference.

BACKGROUND OF THE INVENTION

1. Field of the Invention

The present invention relates to a cable connection structure manufacturing method for bonding an electric cable to an electrode terminal of a substrate and a cable connection structure in which an electric cable is bonded to an electrode terminal of a substrate.

2. Description of the Related Art

As a method of bonding an electric cable to an electrode terminal of a substrate, solder bonding and ultrasound bonding have been widely used. In the solder bonding, low-melting point metal is disposed on a bonding interface and heat treatment is performed. In the ultrasound bonding, for example, ultrasound vibration is applied in a state in which bonding surfaces, both of which are made of gold, are compression-bonded. Note that, in a semiconductor field, a surface activation bonding method is also used. In the surface activation bonding method, plasma treatment or the like is performed on both bonding surfaces, whereby an oxide layer, an absorbate, and the like are removed in vacuum and, then, the bonding surfaces are immediately compression-bonded.

Japanese Patent Application Laid-Open Publication No. 2012-151183 discloses a low-frequency bonding device. In the device, a metal bump performs a turning motion with respect to an electrode terminal under a condition of a frequency of 5 to 100 Hz.

SUMMARY OF THE INVENTION

A cable connection structure manufacturing method in an embodiment of the present disclosure is a method including: covering, by a first electrode, an end face of a core wire of at least one electric cable, the end face being exposed, and covering, by a second electrode, at least one terminal of a substrate, the terminal being exposed on a principal surface; plastically deforming the first electrode and the second electrode having substantially same hardness by first scrubbing in which the first electrode and the second electrode rub against each other at a first pressure and a first amplitude; polishing the first electrode and the second electrode by second scrubbing in which the first electrode and the second electrode rub against each other at a second pressure smaller than the first pressure and a second amplitude smaller than the first amplitude; and bonding the first electrode and the second electrode at a third pressure higher than the first pressure.

A cable connection structure in an embodiment of the present invention includes: at least one electric cable, an end face of a core wire of which is exposed; a first electrode that covers the end face; a substrate, at least one terminal of which is exposed on a principal surface; and at least one second electrode bonded to the first electrode without another member interposed between the first electrode and the second electrode, the second electrode covering the terminal and having substantially same hardness as hardness of the first electrode, a ring-like projection surrounding a bonding region to the first electrode being formed in the second electrode.

DETAILED DESCRIPTION OF THE PREFERRED EMBODIMENTS

First Embodiment

Figure 1:
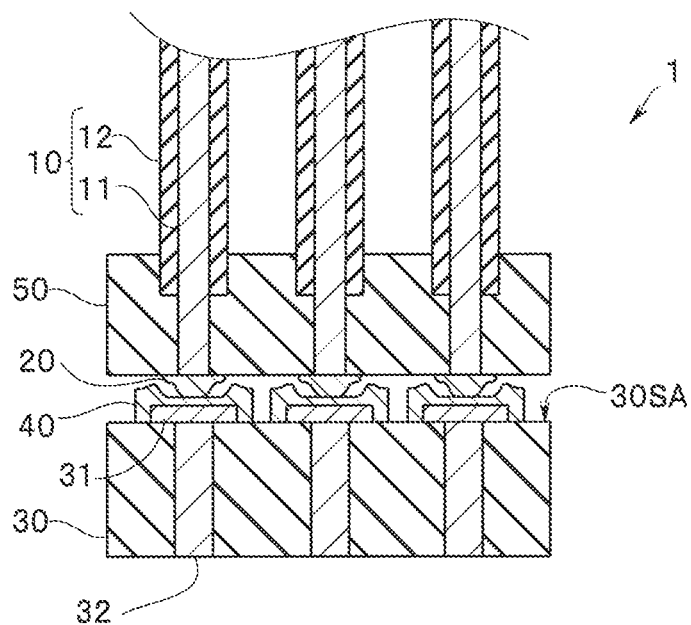
FIG. 1 is a sectional view for explaining a cable connection structure in an embodiment.
Figure 2:
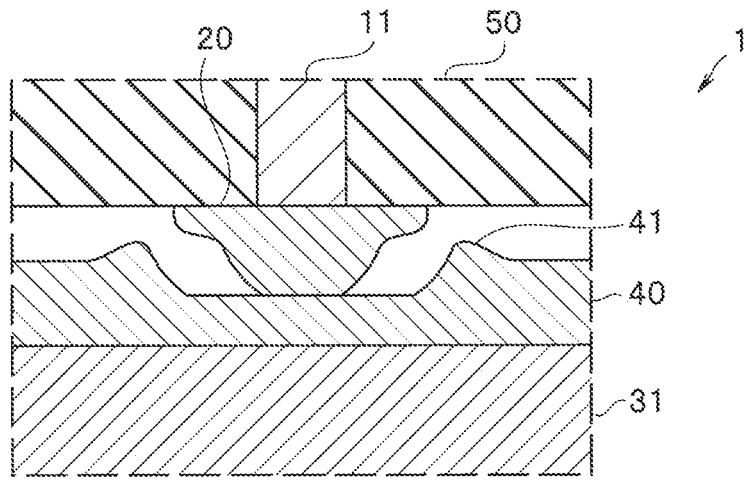
FIG. 2 is a partially enlarged view of FIG. 1.
Figure 3:
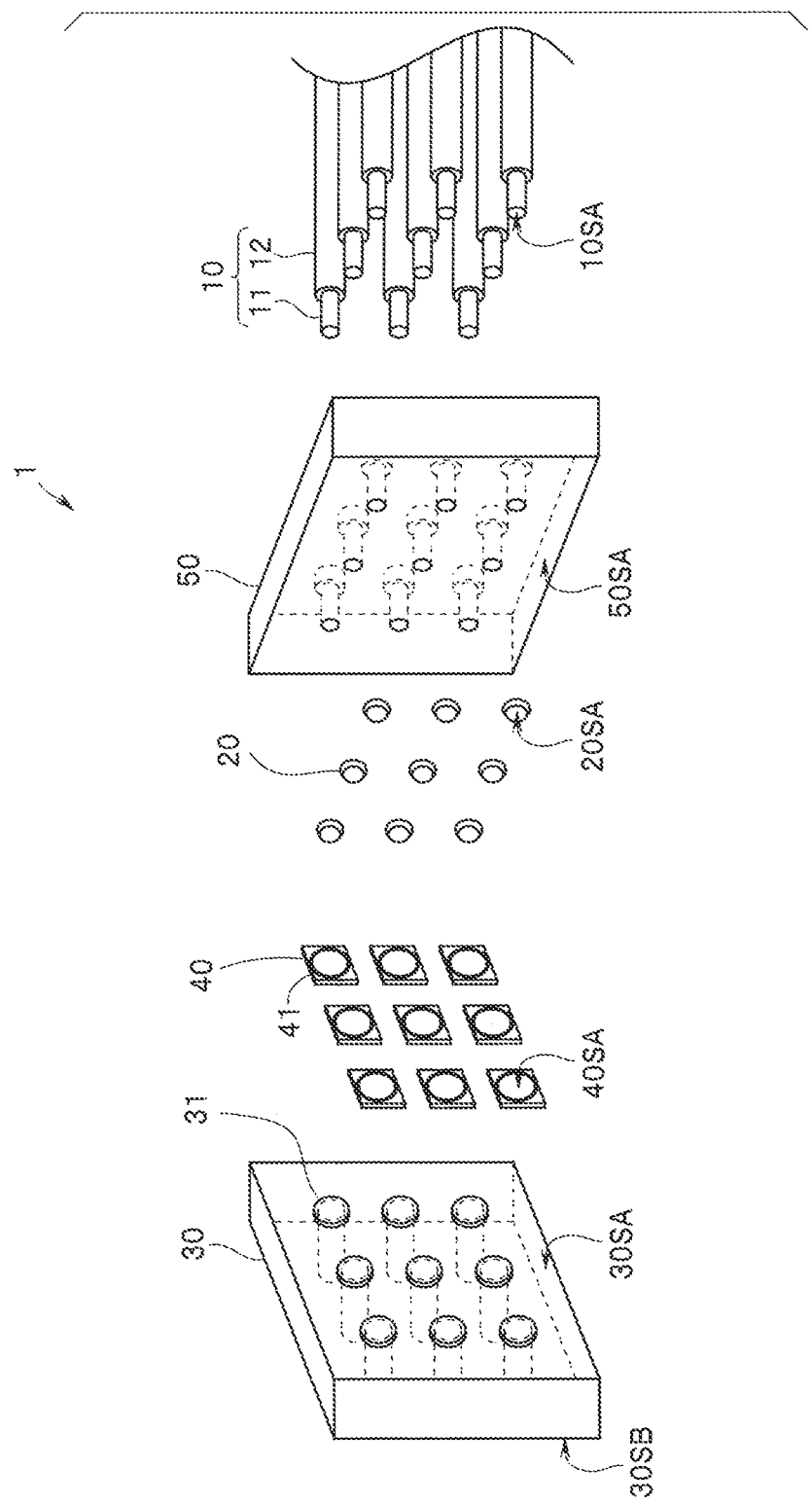
FIG. 3 is an exploded view for explaining the cable connection structure in the embodiment.

As shown in FIG. 1 to FIG. 3, a cable connection structure 1 in the present embodiment includes a plurality of electric cables 10, a plurality of first electrodes 20, a substrate 30, a plurality of second electrodes 40, and a cable fixing unit 50.

Note that, in the following explanation, drawings based on respective embodiments are schematic. Relations between thicknesses and widths of respective portions, ratios of the thicknesses of the respective portions, relative angles, and the like are different from real ones. The drawings sometimes include portions having different dimensional relations and rations among the drawings. Illustration of a part of components and assigning of reference signs and numerals to a part of the components are sometimes omitted.

The electric cable 10 includes a core wire 11 made of a conductor and a coating layer 12 that covers the core wire 11. An end face 10SA of the core wire 11 is not covered by the coating layer 12 and is exposed. The cable fixing unit 50 fixes each of the plurality of electric cables 10 in a predetermined disposition state. The end face 10SA is exposed on a front surface 50SA of the cable fixing unit 50. In other words, the front surface 50SA is a surface on which a plurality of end faces 10SA are exposed. Each of the plurality of first electrodes 20 disposed on the front surface 50SA covers each of the plurality of end faces 10SA.

Note that when the electric cable 10 is a shield cable including a shield wire, the cable fixing unit 50 is configured such that the shield wire is also in a state in which the end face 10SA is exposed on the front surface 50SA (see, for example, Japanese Patent No. 6371414).

On the other hand, a plurality of terminals 31 are exposed on a principal surface 30SA of the substrate 30. Each of the plurality of terminals 31 made of a conductor is, for example, an electrode terminal connected to each of a plurality of through wirings 32. Each of the plurality of second electrodes 40 disposed on the principal surface 30SA covers each of the plurality of terminals 31.

Although not shown, a terminal, which is a part of a surface wiring of the principal surface 30SA of the substrate 30 may be covered by the second electrode 40. A wiring configuring the terminal is, for example, extended to a rear surface 30SB on an opposite side of the principal surface 30SA through a side surface wiring.

Both of the first electrode 20 and the second electrode 40 are made of an electric copper plating film. Copper is a metal having a characteristic that a natural oxide layer is formed in a normal temperature and normal pressure atmosphere. Accordingly, surfaces of the first electrode 20 and the second electrode 40 before bonding are covered by oxide layers.

The inventor found that, with a combination of special bonding surfaces, by performing scrubbing treatment for moving relative positions while compression-bonding both the bonding surfaces, even two electrodes made of metal on which oxide layers are formed are bonded without another member interposed therebetween. The scrubbing treatment is scrubbing treatment in which both the bonding surfaces rub against each other.

As explained below, a manufacturing method in the present embodiment includes scrubbing treatment in two stages having different conditions (a first scrubbing process and a second scrubbing process). In the scrubbing treatment, the first electrode 20 smaller than the second electrode 40 moves, for example, to draw a circle in the second electrode 40. The first electrode 20 and the second electrode 40 are plastically deformed by pressure of the scrubbing treatment. Since amplitude of the scrubbing treatment, that is, a size of a scrubbing circle decreases, a ring-like projection 41 surrounding a bonding region to the first electrode 20 is formed by the plastic deformation on a bonding surface 40SA of the second electrode 40.

The cable connection structure 1 is inexpensive because expensive gold is not used. Metal copper on the bonding surface of the first electrode 20 and metal copper on the bonding surface of the second electrode 40 are bonded without another member interposed therebetween. Therefore, the cable connection structure 1 has high bonding reliability.

<Cable Connection Structure Manufacturing Method>

Figure 4:
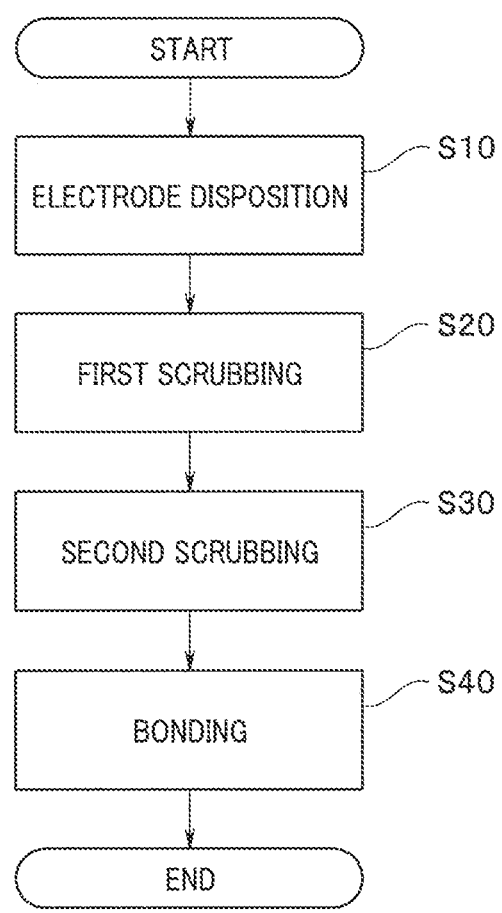
FIG. 4 is a flowchart of a cable connection structure manufacturing method in the embodiment.
Figure 5:
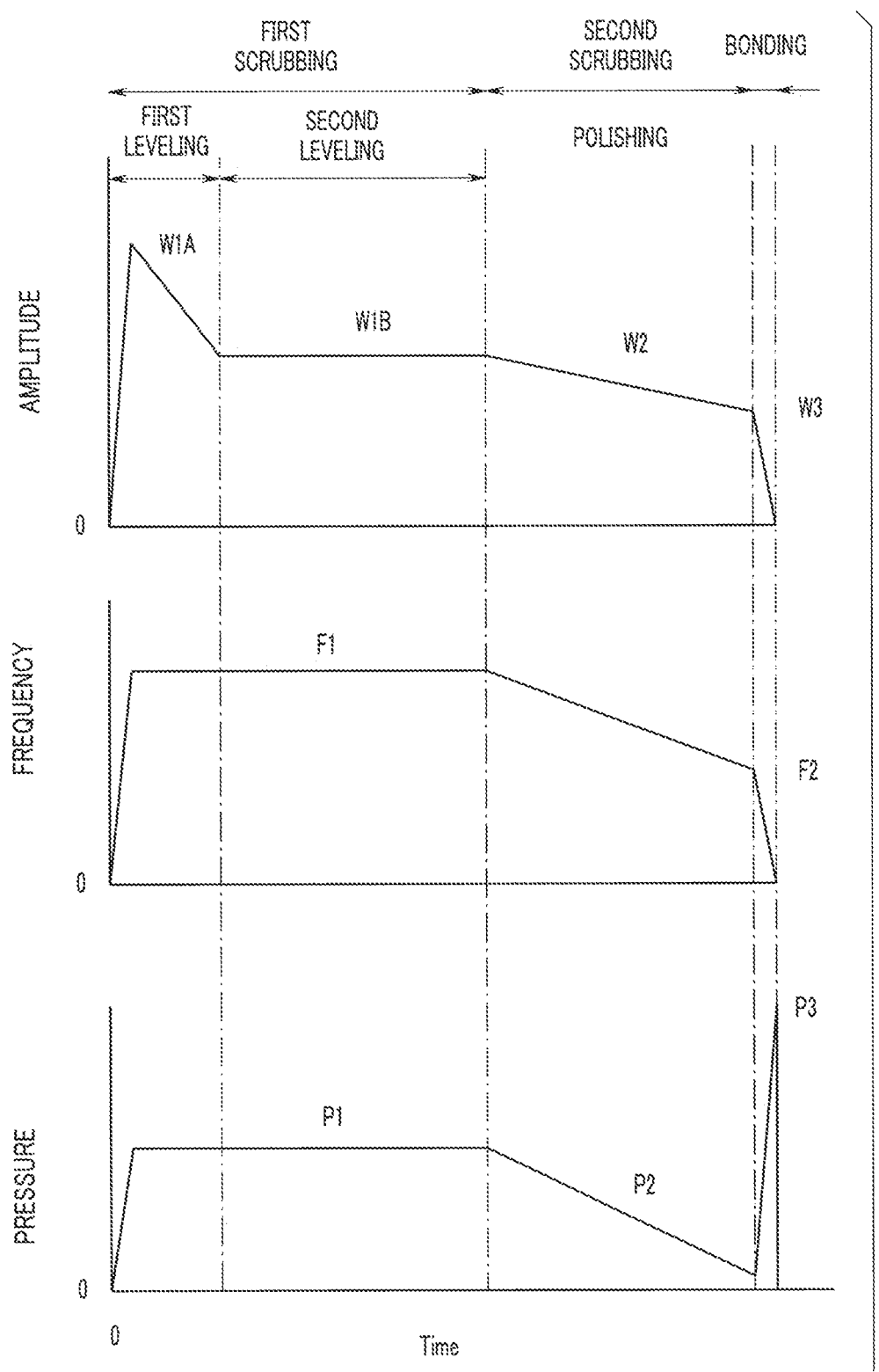
FIG. 5 is a diagram for explaining the cable connection structure manufacturing method in the embodiment.

A cable connection structure manufacturing method is explained with reference to a flowchart of FIG. 4. FIG. 5 shows a temporal change of treatment conditions of the cable connection structure manufacturing method.

<Step S10> Electrode Disposing Process

Figure 6:
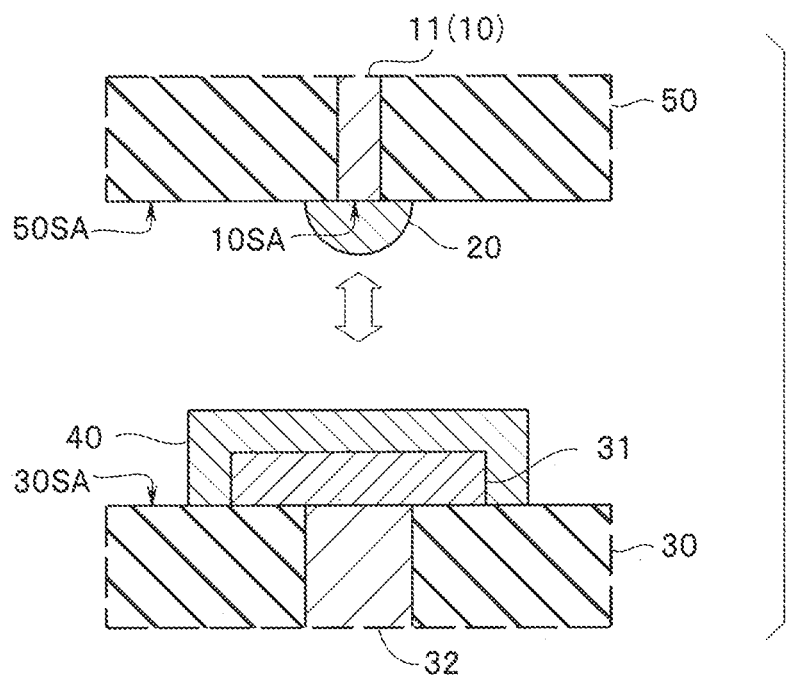
FIG. 6 is a sectional view for explaining the cable connection structure manufacturing method in the embodiment.

As shown in FIG. 6, the end face 10SA of the electric cable 10, which is an end face of the core wire 11, is covered by the first electrode 20. Note that the end faces 10SA of the plurality of core wires 11 are fixed in predetermined disposition positions by the cable fixing unit 50.

The cable fixing unit 50 are effective for efficiently bonding the plurality of electric cables 10. For example, the plurality of electric cables 10, in which the core wires 11 project from the coating layers 12, are embedded in resin in a state in which the plurality of electric cables 10 are disposed in a predetermined manner. The cable fixing unit 50, on a polished surface (a front surface 50SA) of which the end faces 10SA of the plurality of electric cables 10 are exposed, can be manufactured by grinding or polishing one surface. Naturally, a process for bonding one electric cable 10 gripped by a jog and one terminal 31 without using the cable fixing unit 50 may be repeated.

On the other hand, the terminal 31 of the substrate 30, the terminal 31 of which is exposed on the principal surface 30SA, is covered by the second electrode 40.

The first electrode 20 and the second electrode 40 are formed on the same day under the same conditions using the same copper sulfate electric plating bath. A plating film grows isotropically. Accordingly, for example, when the first electrode 20 having thickness of 30 μm is formed on the end face 10SA of the core wire 11 having a diameter of 40 μm, the first electrode 20 is formed in a substantially semispherical convex shape having an outer diameter of 100 μm. Note that, since an area of the terminal 31 is larger compared with an area of the core wire 11, the second electrode 40 is formed in a plane shape even if the second electrode 40 grows isotropically (see FIG. 6).

Note that, conversely to the cable connection structure 1, the bonding surface of the first electrode 20 may be a plane and the second electrode 40 may have a convex shape. The bonding surface of the second electrode 40 is a square but may be a circle or the like if the bonding surface has breadth enough for the first electrode 20 to scrub.

Vickers hardness Hv20 of the first electrode 20 was 100. In contrast, Vickers hardness Hv40 of the second electrode 40 was 90 and was substantially the same as the Vickers hardness Hv20. Vickers hardness Hv was evaluated at weight of 1 g at a room temperature (25° C.) using a method conforming to a micro-Vickers hardness test (JIS-Z2244).

<Step S20> First Scrubbing Process

The first scrubbing process includes a first leveling process 21 and a second leveling process 22. The first electrode 20 and the second electrode 40 have different areas. The first electrode 20, which is an electrode having a small area, is disposed in the second electrode 40, which is an electrode having a large area.

Figure 7:
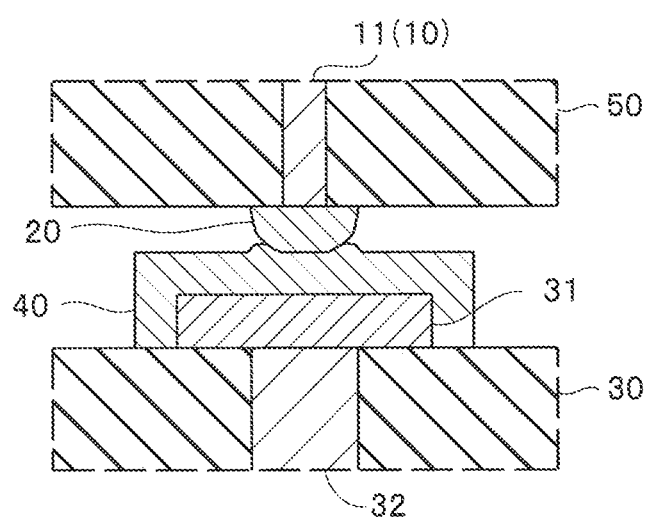
FIG. 7 is a sectional view for explaining the cable connection structure manufacturing method in the embodiment.

As shown in FIG. 5 and FIG. 7, in the first leveling process 21, the first electrode 20 and the second electrode 40 come into contact at normal temperature (25° C.) and humidity of 60% and a first pressure P1 is applied to the bonding surfaces.

Even if the substantially semispherical first electrode 20 comes into contact with the plane of the second electrode 40, if the first electrode 20 and the second electrode 40 are not plastically deformed, only a narrow region near a top of the first electrode 20 comes into contact with the second electrode 40.

In contrast, when the first pressure P1 is applied, both of the first electrode 20 and the second electrode 40 having substantially the same Vickers hardness Hv are plastically deformed. When the first electrode 20 comes into contact with the second electrode 40, the first electrode 20 sinks into the second electrode 40 and decreases in height. In the second electrode 40, an outer circumference of a contact surface with the first electrode 20 swells.

Figure 8:
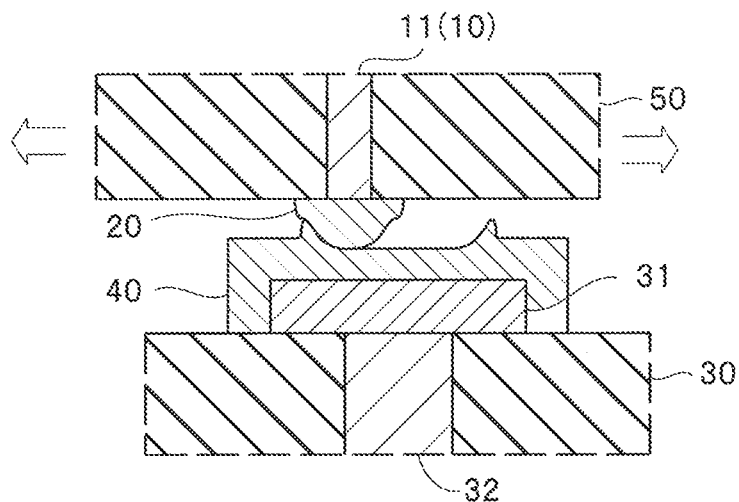
FIG. 8 is a sectional view for explaining the cable connection structure manufacturing method in the embodiment.
Figure 9:
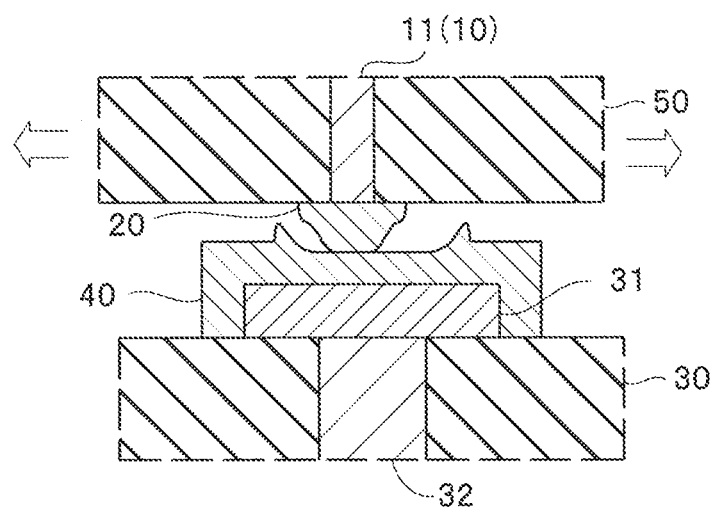
FIG. 9 is a sectional view for explaining the cable connection structure manufacturing method in the embodiment.

As shown in FIG. 8 and FIG. 9, in a state in which the first pressure P1 is maintained, the first electrode 20 and the second electrode 40 rub against each other and relative positions of the first electrode 20 and the second electrode 40 change such that the first electrode 20 draws a circle with respect to the second electrode 40.

For example, as shown in FIG. 10A to FIG. 10D, the bonding surface 20SA of the first electrode 20 is moved with respect to the bonding surface 40SA of the second electrode 40 such that a center C20 of the first electrode 20 draws a circle centering on a center C40 of the second electrode 40. In other words, the first electrode 20 rotates at a frequency F1 while coming into contact with the second electrode 40. As shown in FIG. 5, in the first leveling process 21, amplitude decreases from W1A to W1B.

Figure 11:
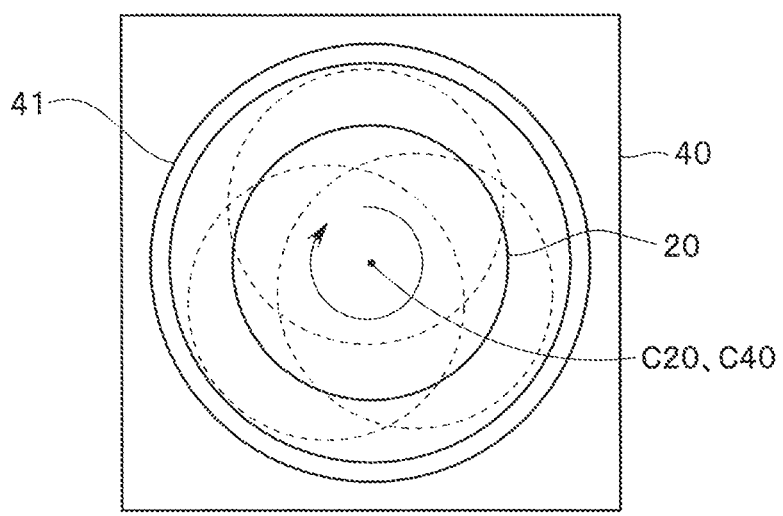
FIG. 11 is a sectional view for explaining the cable connection structure manufacturing method in the embodiment.

Accordingly, as shown in FIG. 11, a ring-like projection 41 is formed on the second electrode 40 by a portion swelled by the plastic deformation. By reducing the amplitude from W1A to W1B in the first leveling process S21, the second leveling process S22 is performed in a range in which the ring-like projection 41, which is a deformed portion outer edge of the second electrode 40 generated in the first leveling process S21, and the first electrode 20 do not come into contact.

In the second leveling process 22, the pressure is maintained at P1 and the amplitude is maintained at W1B smaller than W1A in the first electrode 20 and the second electrode 40.

Slight unevenness that deteriorates smoothness is present on surfaces of the first electrode 20 and the second electrode 40, which are plating films. As shown in FIG. 8 and FIG. 9, the slight unevenness disappears in the first scrubbing process S20 in which the first electrode 20 and the second electrode 40 are plastically deformed and rub against each other. The bonding surface of the first electrode 20 changes to a plane. A plane is also formed on an inside of the ring-like projection 41 of the second electrode 40. At the same time, the oxide layers on the surfaces of the electrodes are peeled and the metal copper on insides of the electrodes is exposed on the surfaces.

<Step S30> Second Scrubbing Process

The first electrode 20 and the second electrode 40 rub against each other at a second pressure P2 smaller than the first pressure P1 and a second amplitude W2 smaller than the first amplitude W1B. In the second scrubbing process, the pressure decreases from the second pressure P2 to smaller pressure. The amplitude also decreases to the amplitude W2 smaller than WIB. The frequency also decreases to a second frequency F2 smaller than the first frequency F1.

The second scrubbing process is a polishing process in which the surface of the first electrode 20 and the surface of the second electrode 40 rub against each other at relatively small pressure without being plastically deformed, whereby the unevenness further decreases.

Thin oxide layers are formed even for a short time on the metal copper exposed on the surfaces in the first scrubbing process. In the second scrubbing process, the thin oxide layers on the surfaces of the first electrode 20 and the second electrode 40 are removed.

<Step S40> Bonding Process

Figure 12:
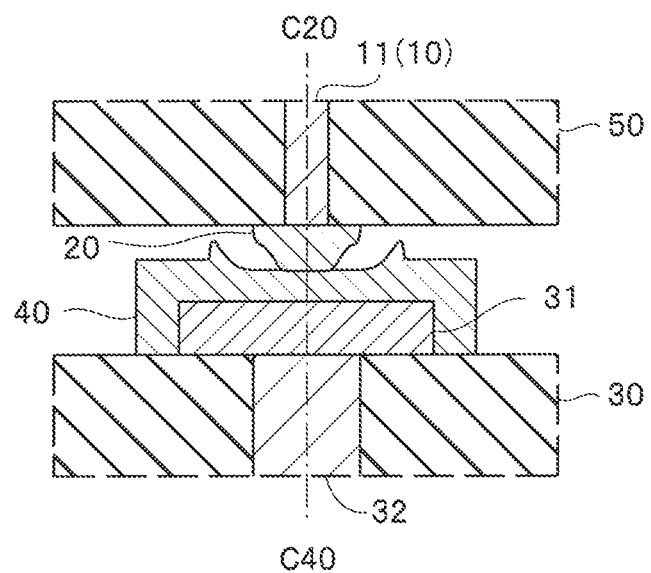
FIG. 12 is a plan schematic view for explaining a cable connection structure bonding method in the embodiment.

As shown in FIG. 12, lastly, a third pressure P3 higher than the first pressure P1 is applied, whereby the first electrode 20 and the second electrode 40 are bonded. Note that, in a last turn, it is preferable that the center C20 of the first electrode 20 is located in the center C40 of the second electrode 40.

In the manufacturing method in the present embodiment, the contact area of the first electrode 20 and the second electrode 40 increases in the first scrubbing process, the oxide layers on the surfaces are efficiently removed in the second scrubbing process, and bonding of metal and metal is obtained in the bonding process.

With the manufacturing method in the present embodiment, it is possible to manufacture a cable connection structure that is inexpensive and has high bonding reliability.

Figure 10A:
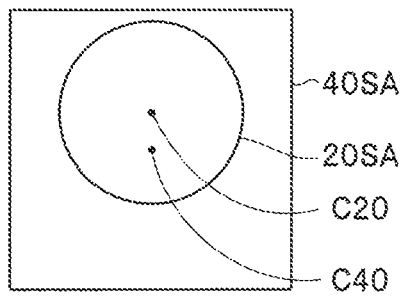
FIG. 10A is a plan schematic view for explaining the cable connection structure manufacturing method in the embodiment.
Figure 10B:
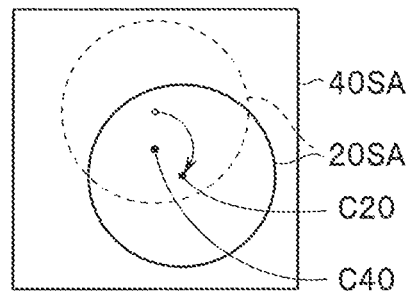
FIG. 10B is a plan schematic view for explaining the cable connection structure manufacturing method in the embodiment.
Figure 10C:
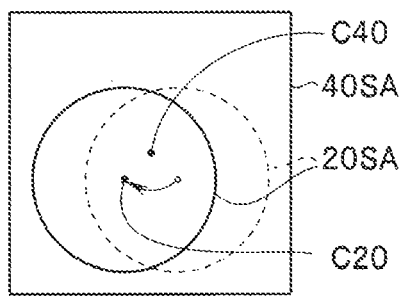
FIG. 10C is a plan schematic view for explaining the cable connection structure manufacturing method in the embodiment.
Figure 10D:
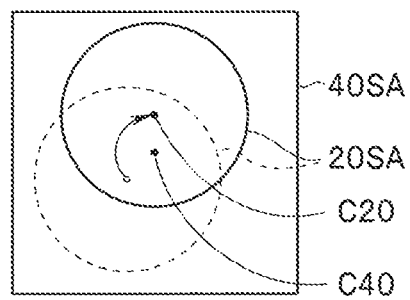
FIG. 10D is a plan schematic view for explaining the cable connection structure manufacturing method in the embodiment.
Figure 13:
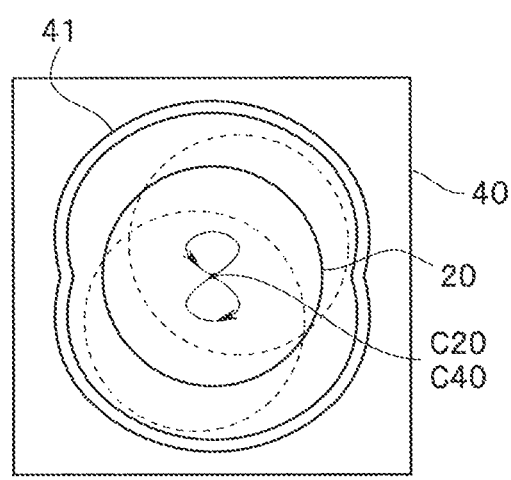
FIG. 13 is a plan schematic view for explaining a cable connection structure manufacturing method in a modification of the embodiment.

In the above explanation, as shown in FIG. 10A to FIG. 11, the first electrode 20 and the second electrode 40 move such that the relative positions draw a circle, strictly, when the amplitude changes, draw a swirl. However, the first electrode 20 and the second electrode 40 may move to draw, for example, a Lissajous figure shown in FIG. 13. The Lissajous figure means a figure of trajectories of points obtained by two single vibrations orthogonal to each other.

Note that, in order to further eliminate possibility that the oxide layer remains in the bonding interface, it is preferable that the second scrubbing process and the bonding process are performed in an inactive atmosphere, for example, a nitrogen atmosphere.

The first electrode 20 and the second electrode 40, both of which were made of the copper plating film, were sometimes not successfully bonded.

When the first electrode 20 and the second electrode 40 were not successfully bonded, the Vickers hardness Hv20 of the first electrode 20 was 180 and the Vickers hardness Hv40 of the second electrode 40 was 90. A hardness difference Hv-Δ occurred in the Vickers hardness Hv because the numbers of elapsed days after film formation were different.

Figure 14:
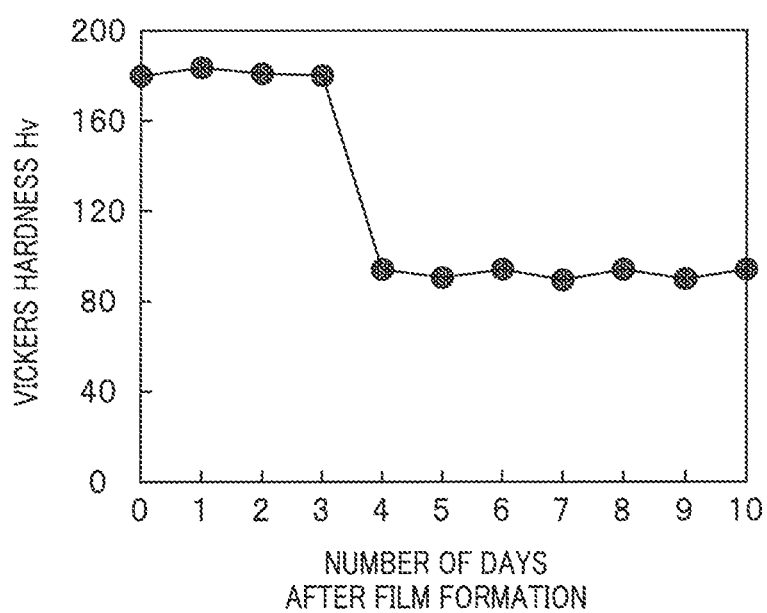
FIG. 14 is a diagram showing a hardness change of a copper plating film.

In other words, in the electric copper plating film, self-anneal occurs in which a crystal grain diameter and hardness change even at a room temperature after film formation. As shown in FIG. 14, the Vickers hardness Hv of the copper plating film immediately after the film formation and after elapse of three days was 180. In contrast, the Vickers hardness Hv of the copper plating film after elapse of seven days was 90.

When the first electrode 20 and the second electrode 40 were not successfully bonded, three days or less elapsed after the first electrode 20 was formed and seven days or more elapsed after the second electrode 40 was formed.

Further, the hardness of the copper plating film greatly changes according to a composition of a plating bath and a film formation condition as well. In other words, the copper plating film includes trace elements other than copper, for example, carbon, sulfur, and hydrogen and the hardness of the copper plating film changes according to contents of the trace elements.

However, if the first electrode 20 and the second electrode 40 have substantially the same Vickers hardness Hv, the bonding surfaces are changed to planes and the oxide layers are removed by the scrubbing treatment. Therefore, a bonding interface formed by the metal copper and the metal copper and having high bonding reliability is obtained.

Having substantially the same Vickers hardness Hv means that a hardness difference Hv-Δ between an arithmetic mean Hv-ave of the Vickers hardness Hv20 of the first electrode 20 and the Vickers hardness Hv40 of the second electrode 40 and the Vickers hardness Hv20 (the Vickers hardness Hv40) is 30% or less and, preferably, 10% or less of the arithmetic mean Hv-ave.

For example, in the bonded cable connection structure 1, the Vickers hardness Hv20 is 100 and the Vickers hardness Hv40 is 90. Therefore, the arithmetic mean Hv-ave is 95 and the hardness difference Hv-Δ is 5 (5.2% of the arithmetic mean Hv-ave). In contrast, in a cable connection structure that is not successfully bonded, the Vickers hardness Hv20 is 180 and the Vickers hardness Hv40 is 90. Therefore, the arithmetic mean Hv-ave is 135 and the hardness difference Hv-Δ is 90 (67% of the arithmetic mean Hv-ave).

When the hardness of the first electrode 20 and the hardness of the second electrode 40 are different, an oxide layer on a soft bonding surface is removed but an oxide layer on a hard bonding surface is not removed. Therefore, the first electrode 20 and the second electrode 40 are not bonded.

In the cable connection structure manufacturing method in the present embodiment, both of the bonding surfaces of the first electrode 20 and the second electrode 40 are plastically deformed by the scrubbing, whereby an increase in the bonding area due to disappearance of unevenness on the surfaces and removal of the oxide layers are accelerated.

Accordingly, it is preferable that the Vickers hardness Hv of both of the first electrode 20 and the second electrode 40 is larger than 50 and smaller than 200. When the Vickers hardness Hv is equal to or smaller than the range, since the bonding surfaces are excessively greatly deformed, it is not easy to obtain satisfactory bonding. When the Vickers hardness Hv is equal to or larger than the range, since the deformation is insufficient, the leveling and the removal of the oxide layers are not easy.

Note that bonding conditions (pressure, frequency, amplitude, and time period) are selected as appropriate according to sizes, numbers, materials, and the like of electrodes. For example, when the first electrode 20 made of a substantially semispherical copper plating film having height of 30 μm is bonded to the second electrode 40 of a 100 μm square, P1=10 kPa, F1=15 Hz, and W1A=50 μm and a total treatment time period is approximately 1.5 seconds. The bonding surfaces of the first electrode 20 and the second electrode 40 are circles having a diameter of 40 μm. The ring-like projection 41 of 70 μm is formed on the second electrode 40.

Note that the above explanation is about the cable connection structure 1 in which the two electrodes made of the electric copper plating film are bonded. However, in the cable connection structure in the embodiment, at least one of the two electrodes may be made of, for example, an electroless copper plating film, a copper vapor deposited film, a copper sputter film, or a rolled copper foil. For example, even in a cable connection structure including a first electrode made of the rolled copper foil and a second electrode made of the electroless copper plating film, the first electrode and the second electrode can be bonded if the first electrode and the second electrode have substantially the same Vickers hardness.

At least one of the first electrode 20 or the second electrode 40 may be made of metal containing copper as a main component by 50 weight % or more, for example, CuNi, CuSn, or CuBe. For example, even after the self-anneal, by using, as the first electrode 20, a Cu-15 weight % Sn electric plating film having Vickers hardness Hv of 190, the first electrode 20 can be bonded to the second electrode 40 made of an electric copper plating film (Vickers hardness Hv=180) immediately after being plated. The metal containing copper as the main component is inexpensive and the bonding according to the present invention is easy.

Note that, if the terminal 31 of the principal surface 30SA of the substrate 30 is made of copper and Vickers hardness of the terminal 31 is substantially the same as the Vickers hardness of the first electrode 20, the terminal 31 can be bonded to the first electrode. In this case, the terminal 31 is regarded as a part of the second electrode.

For example, when both of the terminal 31 of the principal surface 30SA of the substrate 30 and the core wire 11 of the electric cable 10 have the Vickers hardness larger than 50 and smaller than 200, the terminal 31 and the core wire 11 are bonded without another member interposed therebetween. In this case, the end face 10SA of the core wire 11 is regarded as a part of the first electrode and the terminal 31 is regarded as a part of the second electrode.

The Vickers hardness Hv of the terminal 31 and the core wire 11 is also likely to change with time. In the cable connection structure including the first electrode 20 and the second electrode 40, which are hardness adjustment layers having substantially the same hardness, the first electrode 20 and the second electrode 40 can be bonded irrespective of the Vickers hardness Hv of the terminal 31 and the core wire 11.

Note that the first electrode 20 and the second electrode 40 are not limited to the metal containing copper as the main component. It is evident that, even if the first electrode 20 and the second electrode 40 are made of metal having a characteristic that a natural oxide layer is formed in the air, for example, metal containing Sn or Al as a main component, if the first electrode 20 and the second electrode 40 have substantially the same Vickers hardness, the first electrode 20 and the second electrode 40 are bonded without another member interposed therebetween. Further, like the electrode containing copper as the main component, the first electrode 20 and the second electrode 40 preferably have Vickers hardness larger than 50 and smaller than 200.

The present invention is not limited to the embodiments, the modifications, and the like explained above. Various changes, combinations, and applications are possible in a range not departing from the gist of the invention.

What is claimed is:

1. A cable connection structure manufacturing method, the method comprising:
   covering, by a first electrode, an end face of a core wire of at least one electric cable, the end face being exposed, and covering, by a second electrode, at least one terminal of a substrate, the terminal being exposed on a principal surface;
   plastically deforming the first electrode and the second electrode having substantially same hardness by first scrubbing in which the first electrode and the second electrode rub against each other at a first pressure and a first amplitude;
   polishing the first electrode and the second electrode by second scrubbing in which the first electrode and the second electrode rub against each other at a second pressure smaller than the first pressure and a second amplitude smaller than the first amplitude; and
   bonding the first electrode and the second electrode at a third pressure higher than the first pressure;

wherein the first electrode and the second electrode contain copper as a main component; and in the second scrubbing, the second amplitude is greater than zero.

2. The cable connection structure manufacturing method according to claim 1, wherein, in the first scrubbing and the second scrubbing, the first electrode and the second electrode move such that relative positions draw a circle or a Lissajous figure.

3. The cable connection structure manufacturing method according to claim 1, wherein the second scrubbing and the bonding are performed in an inert atmosphere.

4. The cable connection structure manufacturing method according to claim 1, wherein the end face of each of a plurality of electric cables is covered by the first electrode and each of a plurality of terminals of the substrate is covered by the second electrode, and each of a plurality of first electrodes and each of a plurality of second electrodes are bonded.

5. The cable connection structure manufacturing method according to claim 4, wherein the end face of the core wire of each of the plurality of electric cables is fixed to a predetermined disposition position by a cable fixing unit.

6. The cable connection structure manufacturing method according to claim 4, wherein the hardness is Vickers hardness.

7. The cable connection structure manufacturing method according to claim 1, wherein, in the second scrubbing, the second pressure is greater than zero.

8. The cable connection structure manufacturing method according to claim 7, wherein, in the second scrubbing, the second amplitude and the second pressure decrease.

* * * * *